(12) United States Patent
Durham et al.

(10) Patent No.: US 10,901,430 B2
(45) Date of Patent: Jan. 26, 2021

(54) AUTONOMOUS ROBOTIC AVATARS

(71) Applicant: International Business Machines Corporation, Armonk, NY (US)

(72) Inventors: Christopher M. Durham, Austin, TX (US); Inseok Hwang, Austin, TX (US); Bumsoo Kang, Austin, TX (US); Jinho Lee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 15/827,686

(22) Filed: Nov. 30, 2017

(65) Prior Publication Data

US 2019/0163199 A1    May 30, 2019

(51) Int. Cl.
*G05D 1/02*     (2020.01)
*G06F 3/042*    (2006.01)
*G06T 13/40*    (2011.01)

(52) U.S. Cl.
CPC ......... *G05D 1/0246* (2013.01); *G05D 1/0268* (2013.01); *G05D 1/0276* (2013.01); *G05D 1/0282* (2013.01); *G05D 2201/0211* (2013.01); *G06F 3/042* (2013.01); *G06T 13/40* (2013.01)

(58) Field of Classification Search
CPC .. G05D 1/0246; G05D 1/0268; G05D 1/0276; G05D 1/0282; G05D 2201/0211; G06F 3/042; G06T 13/40
See application file for complete search history.

(56) References Cited

U.S. PATENT DOCUMENTS

| 6,292,713 | B1 | 9/2001 | Jouppi et al. |
| 6,346,950 | B1* | 2/2002 | Jouppi ................. G05D 1/0246 345/660 |
| 9,381,426 | B1 | 7/2016 | Hughes et al. |
| 9,538,167 | B2* | 1/2017 | Welch .................. H04N 13/388 |
| 9,595,136 | B2 | 3/2017 | Shuster et al. |
| 9,643,314 | B2 | 5/2017 | Guerin et al. |
| 9,776,327 | B2* | 10/2017 | Pinter .................... B25J 9/1676 |
| 2012/0215380 | A1 | 8/2012 | Fouillade et al. |
| 2013/0035790 | A1* | 2/2013 | Olivier, III ........... G05D 1/0246 700/246 |

(Continued)

FOREIGN PATENT DOCUMENTS

FR          2993086       1/2014

OTHER PUBLICATIONS

Yang et al., "'Being Home' Over Distance: Long Distance Couples and the Use of Telepresence Robots". In submission to the CHI 2017 Workshop, Making Home, Denver, Colorado, May 6, 2017.

(Continued)

*Primary Examiner* — Thomas E Worden
(74) *Attorney, Agent, or Firm* — Law Office of Jim Boice

(57) ABSTRACT

A method controls a remote robotic avatar based on a description of a physical object. A message transmitter transmits a message to a remote robotic avatar instructing the remote robotic avatar to identify a physical object at a remote second location, where an appearance of the physical object is described in the message. The message transmitter also transmits an instruction to the remote robotic avatar to approach the physical object at the remote second location and to initiate a teleoperative session between an entity in a first location and the remote robotic avatar at the remote second location.

18 Claims, 10 Drawing Sheets

(56) References Cited

U.S. PATENT DOCUMENTS

| | | | |
|---|---|---|---|
| 2013/0066468 A1 | 3/2013 | Choi et al. | |
| 2013/0325244 A1 | 12/2013 | Wang et al. | |
| 2014/0142757 A1* | 5/2014 | Ziegler | B25J 5/007 |
| | | | 700/255 |
| 2014/0222206 A1 | 8/2014 | Mead et al. | |
| 2015/0301592 A1* | 10/2015 | Miller | G06F 3/011 |
| | | | 345/156 |
| 2016/0046023 A1 | 2/2016 | Nagendran et al. | |
| 2017/0023944 A1 | 1/2017 | Wang et al. | |
| 2017/0038829 A1 | 2/2017 | Lanier et al. | |
| 2017/0098309 A1* | 4/2017 | Michel | B25J 9/1692 |
| 2017/0106738 A1* | 4/2017 | Gillett | B60K 7/0007 |
| 2017/0168482 A1 | 6/2017 | Kratz et al. | |
| 2017/0206095 A1* | 7/2017 | Gibbs | G06F 3/167 |
| 2017/0213473 A1* | 7/2017 | Ribeira | G06F 19/3456 |
| 2018/0284802 A1* | 10/2018 | Tsai | H04N 5/2353 |
| 2018/0364731 A1* | 12/2018 | Liu | G06T 1/20 |
| 2018/0373239 A1* | 12/2018 | Tsubota | G05D 1/0022 |
| 2019/0188895 A1* | 6/2019 | Miller, IV | G06F 3/011 |
| 2020/0174584 A1* | 6/2020 | Schliemann | G06F 3/017 |

OTHER PUBLICATIONS

Neustaedter et al., "Family Communication Over Distance Through Telepresence Robots". Proceedings of the CSCW 2016 Workshop on Robots in Groups and Teams at the Conference on Computer Supported Cooperative Work and Social Computing. (2017).

Pan Wee Ching et al., "Design and Development of Edgar—A Telepresence Humanoid for Robot-Mediated Communication and Social Applications", IEEE International Conference on Control and Robotics Engineering, 2016, Singapore, IEEE, (Abstract Only).

P. Mell et al., "The NIST Definition of Cloud Computing", National Institute of Standards and Technology, Information Technology Laboratory, Sep. 2011, pp. 1-7.

Pejsa et al., "ROOM2ROOM: Enabling Life-Size Telepresence in a Projected Aumented Reality Environment." Proceedings of the 19th ACM Conference on Computer-Supported Cooperative Work & Social Computing. ACM, 2016.

Rae et al., "Bodies in Motion: Mobility, Presence, and Task Awareness in Telepresence." Proceedings of the 32nd Annual ACM Conference on Human Factors in Computing Systems. ACM, 2014.

Tsai et al., "Developing a Telepresence Robot for Interpersonal Communication With the Elderly in a Home Environment". Telemedicine and E-Health, 13(4) (2007), 407-424.

Kristoffersson et al., "A Review of Mobile Robotic Telepresence". Advances in Human-Computer Interaction (2013), 3.

Johnson et al., "Socially Assistive Robots: A Comprehensive Approach to Extending Indpenendent Living". International Journal of Social Robotics, 6(2) (2014), 195-211.

List of IBM Patents and Patent Applications Treated as Related, Nov. 30, 2017.

* cited by examiner

AUTONOMOUS ROBOTIC AVATARS

BACKGROUND

The present invention relates to the field of robotics, and particularly to robots that emulate human movement. Still more particularly, the present invention relates to dynamically controlling a remote robotic avatar according to a movement of a local user to a functionally equivalent location.

SUMMARY

In an embodiment of the present invention, a method controls a remote robotic avatar. One or more sensors detect a first person approaching a first object in a first location, where the first object is a particular type of object. A message transmitter transmits a message to a remote robotic avatar instructing the remote robotic avatar to identify a second object at a second location, where the second object is the particular type of object of the first object, and where the remote robotic avatar is at the second location that is remote from the first location. The message transmitter transmits an instruction to the remote robotic avatar to approach the second object at the second location and to initiate a teleoperative session between the first person in the first location and the remote robotic avatar at the second location.

In an embodiment of the present invention, a method controls a remote robotic avatar based on a description of a physical object. More specifically, a message transmitter transmits a message to a remote robotic avatar instructing the remote robotic avatar to identify a physical object at a second location, where an appearance of the physical object is described in the message. The message transmitter also transmits an instruction to the remote robotic avatar to approach the physical object at the second location and to initiate a teleoperative session between a first person in a first location and the remote robotic avatar at the second location.

In an embodiment of the present invention, a computer program product for controlling a remote robotic avatar includes a non-transitory computer readable storage device having program instructions embodied therewith, such that the program instructions are readable and executable by a computer to perform a method of: transmitting, by a message transmitter, a message to a remote robotic avatar instructing the remote robotic avatar to identify a physical object at a second location, where an appearance of the physical object is described in the message; and transmitting, by the message transmitter, an instruction to the remote robotic avatar to approach the physical object at the second location and to initiate a teleoperative session between a first person in a first location and the remote robotic avatar at the second location.

In an embodiment of the present invention, a robotic avatar includes: a sensor receiver for receiving sensor readings from a set of one or more sensors at a first location, where the set of one or more sensors detect a first person approaching a first object in the first location, and where the first object is a particular type of object; an instruction receiver for receiving a message instructing the robotic avatar to identify a second object in a second location, where the second object is the particular type of object of the first object, and where the robotic avatar is in the second location that is remote from the first location; an autonomous locomotion system for approaching the second object in response to receiving the message instructing the robotic avatar to approach the second object at the second location; and a teleoperative device for performing a teleoperative session between the first person in the first location and the robotic avatar in the second location in response to the robotic avatar approaching the second object in the second location.

Alternative embodiments of the present invention can also be implemented as a method, a computer program product and/or a robotic device if described above in another embodiment.

DETAILED DESCRIPTION

Figure 1:
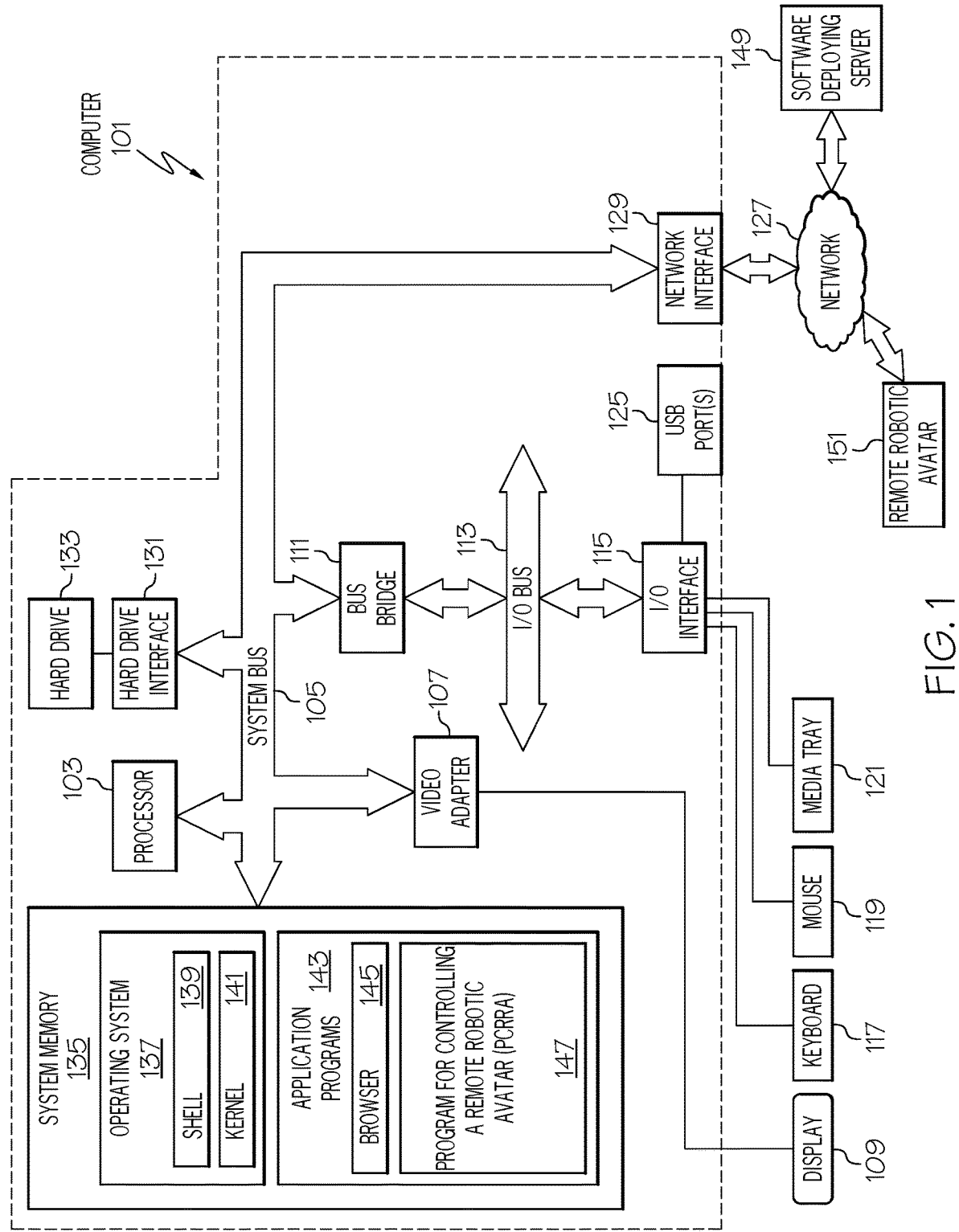
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a remote robotic avatar 151 shown in FIG. 1, and/or the personal monitor 307 and/or the avatar coordinating system 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Controlling a Remote Robotic Avatar (PCRRA) 147. PCRRA 147 includes code for implementing the processes described below, including those described in FIGS. 2-8. In one embodiment, computer 101 is able to download PCRRA 147 from software deploying server 149, including in an on-demand basis, wherein the code in PCRRA 147 is not downloaded until needed for execution. In one embodiment of the present invention, software deploying server 149 performs all of the functions associated with the present invention (including execution of PCRRA 147), thus freeing computer 101 from having to use its own internal computing resources to execute PCRRA 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
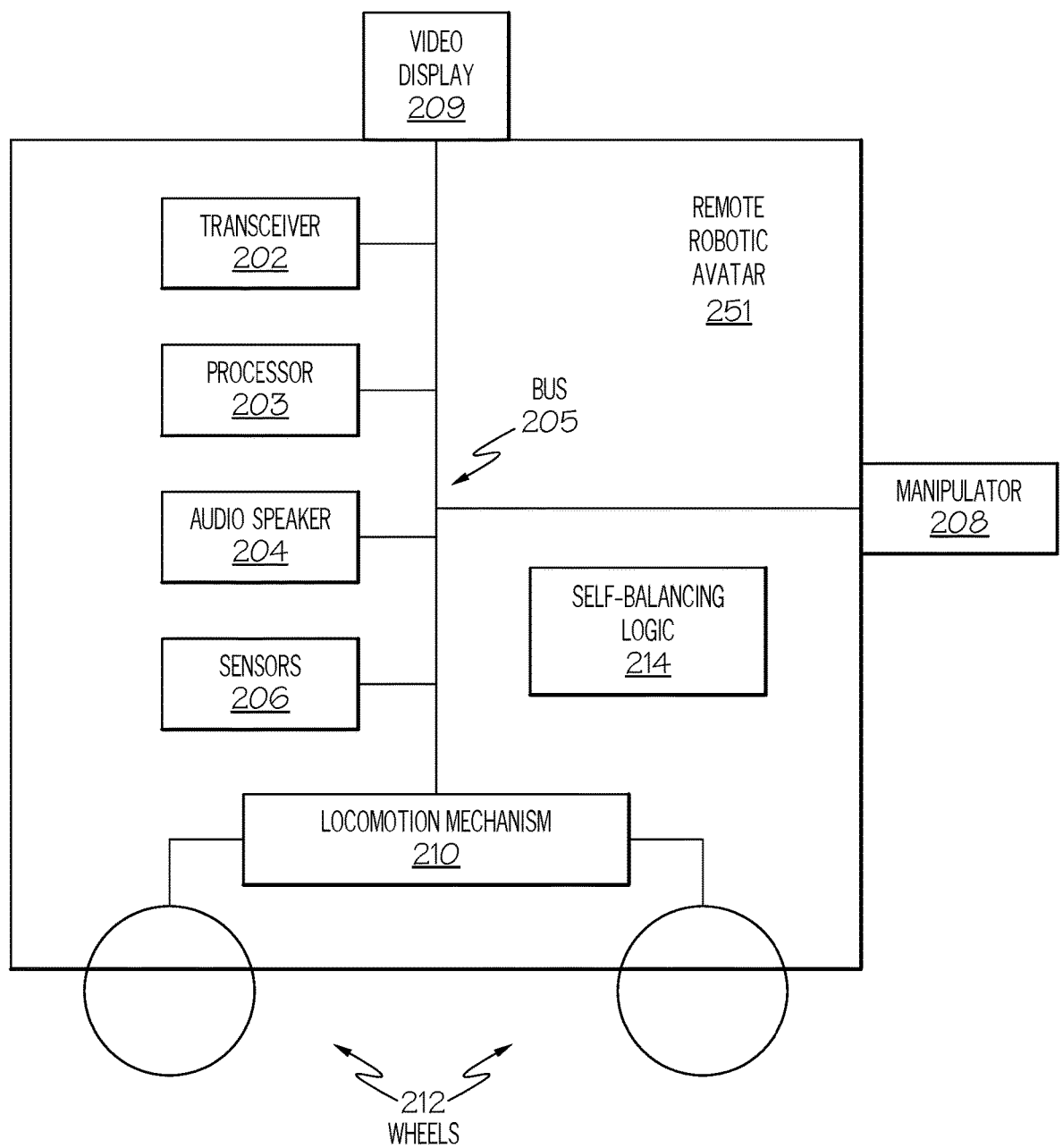
FIG. 2 illustrates an exemplary robotic avatar in accordance with one or more embodiments of the present invention.

With reference now to FIG. 2, a block diagram of an exemplary remote robotic avatar 251 (analogous to the remote robotic avatar 151 shown in FIG. 1) is depicted in accordance with one or more embodiments of the present invention.

Remote robotic avatar 251 is a physical robot that "stands in" for a person at a remote location. As described herein, the remote robotic avatar 251 is not controlled by the person manipulating a joystick or other controller, nor is the remote robotic avatar 251 simply emulating movements of the person. That is, the remote robotic avatar 251 does not move left or right or forward or backward in response to the person manipulating a controller (e.g., a joystick on a radio transmitter), nor does that remote robotic avatar 251 move left or right or forward or backward whenever the person similarly moves left or right or forward or backward. Rather, the remote robotic avatar 251 moves towards a particular type of object and/or a defined functional area, rather than moving left or right or forward or backward based on the person's input to a controller or in emulation of the person's movement.

Additional detail of how the remote robotic avatar 251 moves is described below. First, however, an exemplary remote robotic avatar 251 is presented in a block description of functional components in FIG. 2.

As shown in FIG. 2, the remote robotic avatar 251 includes a processor 203, which is analogous to processor 103 shown in FIG. 1. Processor 203 is electrically coupled to a bus 205 (analogous to system bus 105 and/or I/O bus 113 shown in FIG. 1).

Also coupled to the bus 205 is a transceiver 202, which is able to transmit and receive (transceiver) wireless signals. For example, transceiver 202 is able to receive a video feed of a person who is at a remote location (e.g., their face or their environment), and can display it on a video display 209 (analogous to display 109 shown in FIG. 1). Thus, if remote robotic avatar 251 has a physical shape/appearance that is similar to a remote person, then the video display 209 would show a static and/or moving image of the remote person's face. Alternatively, the transceiver 202 may receive a remote feed showing an environment (e.g., the interior of a room in which a remote person is located), and display that view on the video display 209.

Also coupled to bus 205 is an audio speaker 204, which can emit audio content received from a remote location by the transceiver 202. For example, audio speaker 204 can function as a remote speaker for audio input produced by a person at another location.

Sensors 206 are sensors that detect an environment around the remote robotic avatar 251, including both general areas and spaces to be occupied in the environment and also objects to be avoided. For example, one or more of the sensors 206 may be a still or video digital camera, whose images can be put on the bus 205 for transmission to a remote location by transceiver 202, or may be stored in a local or remote (e.g., cloud) storage device (not shown, but analogous to hard drive 133 shown in FIG. 1) under the direction of the processor 203.

In another embodiment, one or more of the sensors 206 may be a chemical detector, which is able to detect a particular chemical, smell, odor, etc. using known scent detectors, such as an electronic nose that uses a metal-oxide semiconductor (MOSFET) transistor that amplifies electronic signals generated by conducting organic polymers, polymer composites, and/or a quartz crystal resonator that create a unique signal indicative of a particular airborne element.

In another embodiment, one or more of the sensors 206 may be a sound detector (e.g., a microphone), which generates a digital signal that can be qualified to identify a particular device, unit of machinery, personal voice, etc. by comparing the digital signal to a known database of captured and digitized sounds (e.g., using a fast Fourier transform—FFT analysis).

In another embodiment, one or more of the sensors 206 may be a vibration detector, which uses strain gauges, accelerometers, etc. to detect physical vibrations (i.e., vibrations that are conducted through solids and/or liquids, and which may or may not produce audible sound waves) being generated by one or more objects. For example, a vibration detector may be able to detect a piece of rotating machinery (e.g., a pump) that has a signature vibration that is physically communicated across a floor on which the pump and the remote robotic avatar 251 are located.

Therefore, one or more of the sensors 206 may be used not only to identify the environment of the remote robotic avatar 251 (e.g., the interior of a room in which a remote person is located), but also to facilitate the ability of the remote robotic avatar 251 to negotiate around obstacles and/or structures within the remote location.

Also coupled to the bus 205 is a manipulator 208, which is a physical device that can interact with a physical object. For example, manipulator 208 may be a set of mechanical arms that are able to lift an object, open a door, turn on a switch, etc. using a set of gears, pulleys, motors, etc. In another embodiment, manipulator 208 is a device that is able to interact with a device in a non-touching way. For example, such as device may be a liquid cannon that is able to disarm a dangerous device by spraying water or another liquid agent onto a device in order to render it inert (e.g., render an explosive device inoperable).

Also coupled to the bus 205 is a locomotion mechanism 210 that is able, under the direction of the processor 203 using signals generated by the sensors 206 and/or other information about a remote person (e.g., person 303 shown in FIG. 3) or a remote environment (e.g., the second location 311 shown in FIG. 3) via the transceiver 202, to direct electro-mechanical components of the locomotion mechanism 210 to move and steer the remote robotic avatar 251 (e.g., by rolling and steering wheels 212). In a preferred embodiment, remote robotic avatar 251 includes a self-balancing logic 214, which includes accelerometers, gravity detectors, etc. that cause the locomotion mechanism 210 to keep the remote robotic avatar 251 in an upright position, even though it may be balanced on only two wheels (or even one ball) or two appendages (e.g., "legs"). This embodiment allows the remote robotic avatar 251 to have a physical appearance that emulates that of a human person. However, in various embodiments, any means of locomotion including powered treads, powered tracks, powered spheres, powered multiple wheels, steering jets or other propellant-based steerage systems, etc., are within the scope of the present invention.

Figure 3:
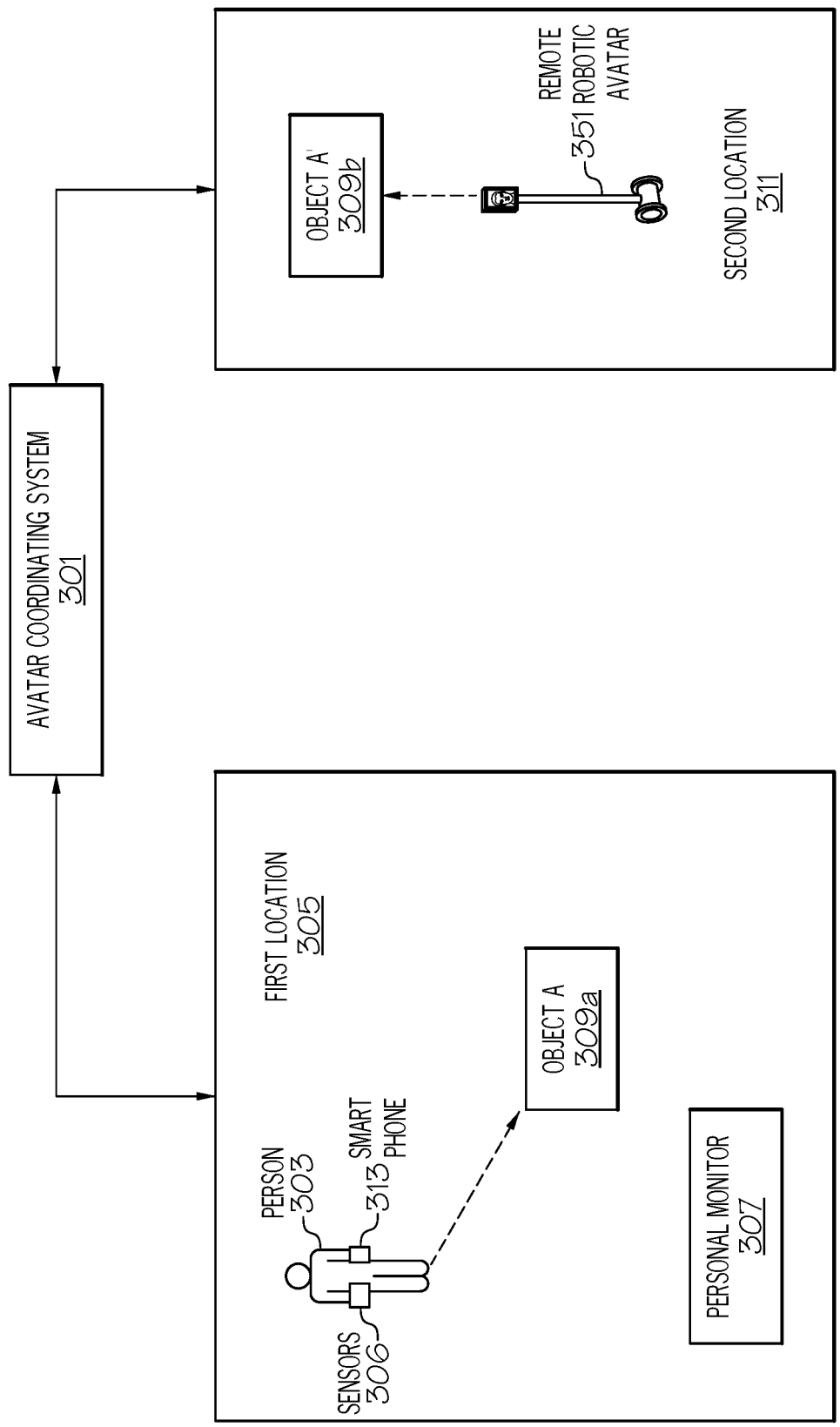
FIG. 3 depicts a high-level overview of one or more embodiments of the present invention.

With reference now to FIG. 3, a high-level overview of one or more embodiments of the present invention is presented.

Assume that a person 303 is standing in a first location 305 (e.g., a room). Assume further that a personal monitor 307 (e.g., a camera mounted in the first location 305) detects that the person 303 has moved towards an Object A (also identified as element 309*a*, but referred to herein as "Object A"). An avatar coordinating system 301 (analogous in architecture to computer 101 shown in FIG. 1) detects that person 303 has moved to Object A, and identifies what type of object Object A is (e.g., a person, a box, a refrigerator, a sofa, etc.). The avatar coordinating system 301 then sends a signal to the remote robotic avatar 351 (analogous to the remote robotic avatar 251 shown in FIG. 1) in second location 311 (e.g., a room in a different building, in another city, in another country, in outer space, etc. that is remote from the first location 305) to 1) identify and locate Object A' (also identified as element 309*b*, but referred to herein as "Object A'") based on the object type description provided by the avatar coordinating system 301, and 2) move towards Object A'. Note that the position of Object A within the first location 305 is different from the position of Object A' within the second location 311, and the relative position between the person 303 and Object A is different from the relative position between the remote robotic avatar 351 and Object A'. Thus, the only information needed by the remote robotic avatar 351 to direct its movement is a description of the type of object that Object A' is.

In an alternative embodiment, the avatar coordinating system 301 will simply send a digital image, and/or a digital chemical signature, and/or a digital sound signature, and/or a digital vibration signal to the remote robotic avatar 351, which is then used to locate and approach Object A'. That is, such "signatures" are descriptions of a particular entity.

For example, assume that person 303 is wearing sensors 306 (e.g., one or more of the sensors 206 described in FIG. 2 as used by the remote robotic avatar 351). Assume for explanatory purposes that one of the sensors 306 is a chemical sensor. As such, when person 303 comes close to Object A, that chemical sensor will generate a particular chemical digital signature that identifies both the scent of Object A as well as the intensity of that scent. This information is processed by logic within the sensors 306 (e.g., a processor and a transceiver) and sent to the avatar coordinating system 301, which directs the remote robotic avatar 351 to locate and approach an Object A' in the second location 311 that smells like Object A in the first location 305.

While the digital signature for Object A may be generated by sensors 306 as just described, in an embodiment of the present invention person 303 may select an option (e.g., from a display on a smart phone 313) for a particular image, sound, scent, vibration, etc. to be located by the remote robotic avatar 351.

For example, the display on the smart phone may show a menu of images of different entities (e.g., particular persons, appliances, etc.). The user will select one of the entities, which will cause the smart phone 313 to send a signal to the avatar coordinating system 301, letting the avatar coordinating system 301 know that the user wants to remote robotic avatar 351 to identify a particular entity (e.g., a particular person) or a particular type of entity (e.g., any person). The smart phone 313 and/or the avatar coordinating system 301 contains a database of digital descriptions (e.g., image files, chemical signatures, etc.) that include a digital description of Object A', which the remote robotic avatar 351 uses to identify Object A'.

Figure 4:
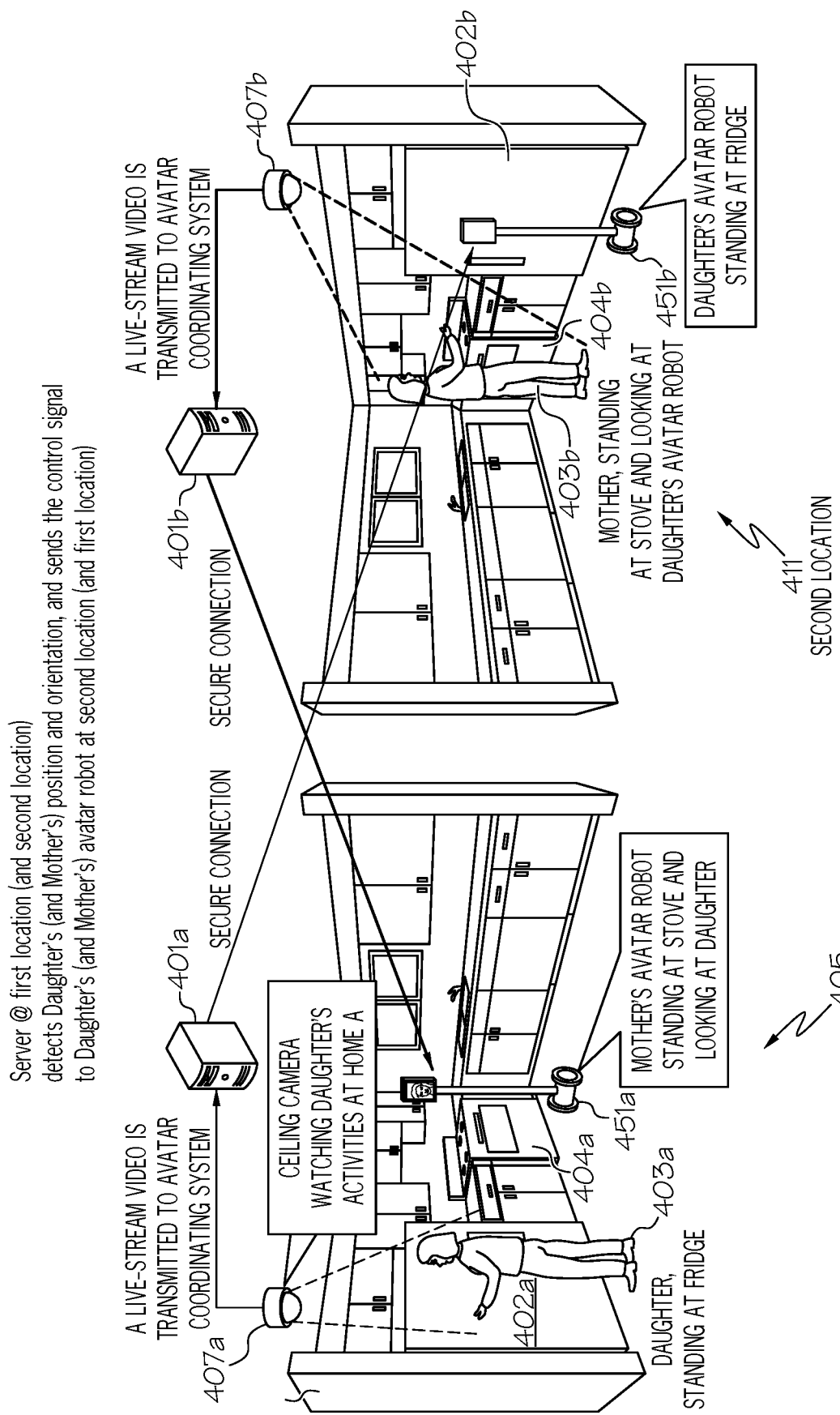
FIG. 4 illustrates an exemplary use case of the present invention.

With reference now to FIG. 4, consider the depicted exemplary use case of the present invention. Assume that person 403*a* (analogous to person 303 shown in FIG. 3) is a daughter of person 403*b* (also analogous to person 303 shown in FIG. 3). As depicted, person 403*a* is standing in a first location 405 (analogous to first location 305 shown in FIG. 3), while person 403*b* is standing in a second location 411 (analogous to second location 311 shown in FIG. 3). The first location 405 and the second location 411 may be different rooms in a same building, may be in different parts of a city or state, or may be separated by continents (or even terrestrial space versus outer space). As such, the daughter (person 403a) and the mother (person 403b) are unable to interact face-to-face within the same room. Thus, their respective avatars (remote robotic avatars 451a-451b, analogous to remote robotic avatar 351 shown in FIG. 3) act as their surrogates.

For example, assume that the daughter (person 403a) is standing in front of a refrigerator 402a in her kitchen, as detected by a personal monitor 407a (analogous to personal monitor 307 shown in FIG. 3). In the example shown in FIG. 4, assume that personal monitor 407a is a camera, which sends a live stream video to an avatar coordinating system 401a (analogous to avatar coordinating system 301 shown in FIG. 3), which is specific for the first location 405. The avatar coordinating system 401a sends a control signal to the daughter's remote robotic avatar 451b, directing it to move to the refrigerator 402b in the mother's kitchen (second location 411).

Similarly, assume that the mother (person 403b) is standing in front of a stove 404b in her kitchen, as detected by a personal monitor 407b (analogous to personal monitor 307 shown in FIG. 3). Again, assume that personal monitor 407b is a camera, which sends a live stream video to an avatar coordinating system 401b (analogous to avatar coordinating system 301 shown in FIG. 3), which is specific for the second location 411. The avatar coordinating system 401b sends a control signal to the mother's remote robotic avatar 451a, directing it to move to the stove 404a in the daughter's kitchen (first location 405).

Note that the location of the refrigerator 402b and stove 404b and the layout of second location 411 are different from the location of the refrigerator 402a and stove 404a and the layout of first location 405, as are the positions of the daughter (person 403a) and the mother (person 403b) in their respective kitchens. However, this is irrelevant to the present invention, since the remote robotic avatars 451a-451b are guided solely by their identification of the respective appliances.

As shown in FIG. 4, the remote robotic avatars 451a-451b respectively provide surrogates for the mother (person 403b) and the daughter (person 403a), such that the daughter and mother do not simply communicate with one another (since the remote robotic avatars 451a-451b have the telecommunication capabilities provides by the transceiver 202, audio speaker 204, and video display 209 shown in FIG. 2), but also interact in physical space. That is, the remote robotic avatars 451a-451b are repositioned to the same functional areas as their respective actual persons, so a more life-like interaction between the remote robotic avatars 451a-451b and the persons is achieved.

Figure 5:
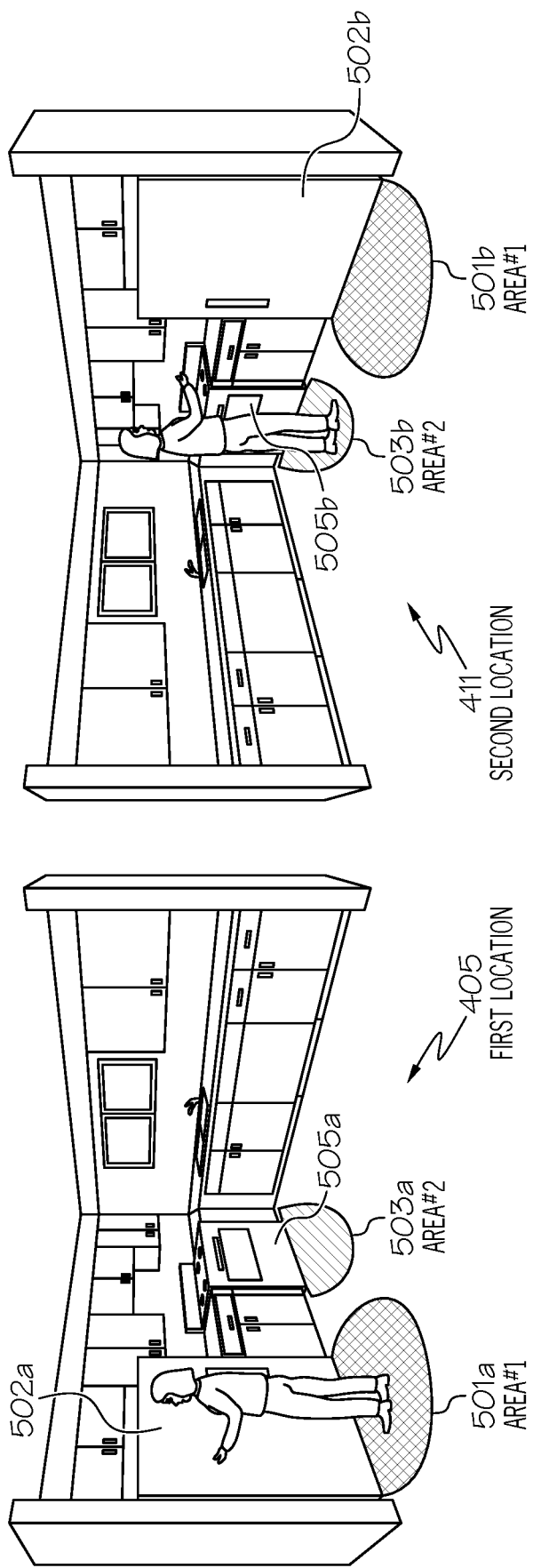
FIG. 5 and FIG. 6 depict an embodiment of the present invention that defines functional areas that are used when directing a movement of a robotic avatar.

With reference now to FIG. 5, assume that the remote robotic avatars 451a-451b are to be directed to a functional area, as defined by an object that is designed to be within that functional area. For example, assume that a refrigerator 502a (analogous to refrigerator 402a shown in FIG. 4) is in Area #1 (identified in FIG. 5 as area 501a within the daughter's kitchen—first location 405). Similarly, a refrigerator 502b (analogous to refrigerator 402b shown in FIG. 4) is in Area #1 (identified in FIG. 5 as area 501b within the mother's kitchen—second location 411). Thus, Area #1, regardless of whether it is in first location 405 or second location 411, is a functional area in which a refrigerator should be located (based on plumbing, etc.).

Similarly, Area #2 (identified as area 503a in the first location 405 and area 503b in the second location 411) is where a stove (stove 505a in first location 405 and stove 505b in the second location 411) is designated to be located. In FIG. 5, the stoves 505a-505b are depicted as actually being within the functional areas 503a-503b. Likewise, the refrigerators 502a-502b are depicted as actually being within the functional areas 501a-501b. However, even if one or more of the refrigerators 502a-502b or stoves 503a-503b are not physically within their locations/areas, the functional areas 501a-501b and/or 503a-503b are still defined and identifiable by the system. That is, based on plumbing or other features in these areas, or preferably based on whether the areas at one time in the past had a stove/refrigerator in the areas, the functional areas are permanently defined.

Figure 6:
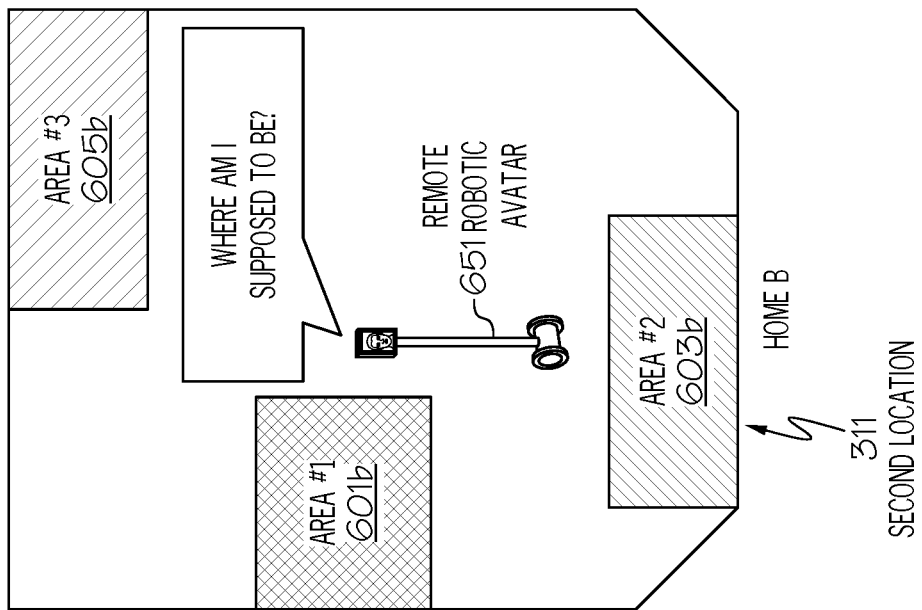
Figure 6:
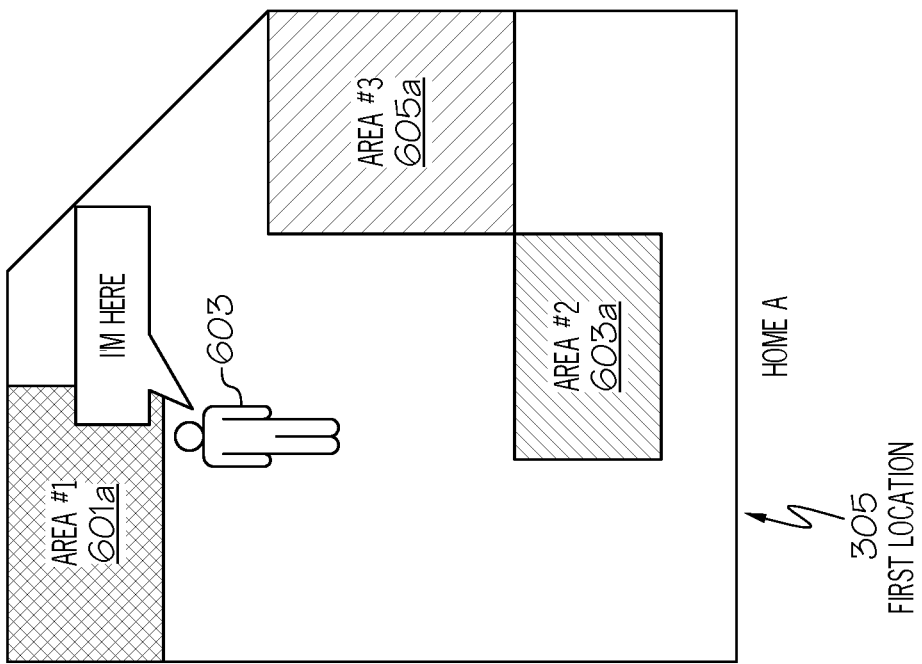

As shown FIG. 6, these areas are then used by the system to determine where the robotic avatar should be located. For example, when the person 603 is standing next to functional Area #1 (area 601a) in Home A (first location 305 shown in FIG. 3), then the system described above will direct the remote robotic avatar 651 to move to the functional Area #1 (area 601b) in Home B (second location 311 shown in FIG. 3). The positions of Areas #2 (areas 603a-603b—analogous to areas 503a-503b shown in FIG. 5) and Areas #3 (areas 605a-605b) are irrelevant, since the remote robotic avatar 651 is directed to move to Area #1 (area 601b), which was defined in FIG. 5.

Figure 7:
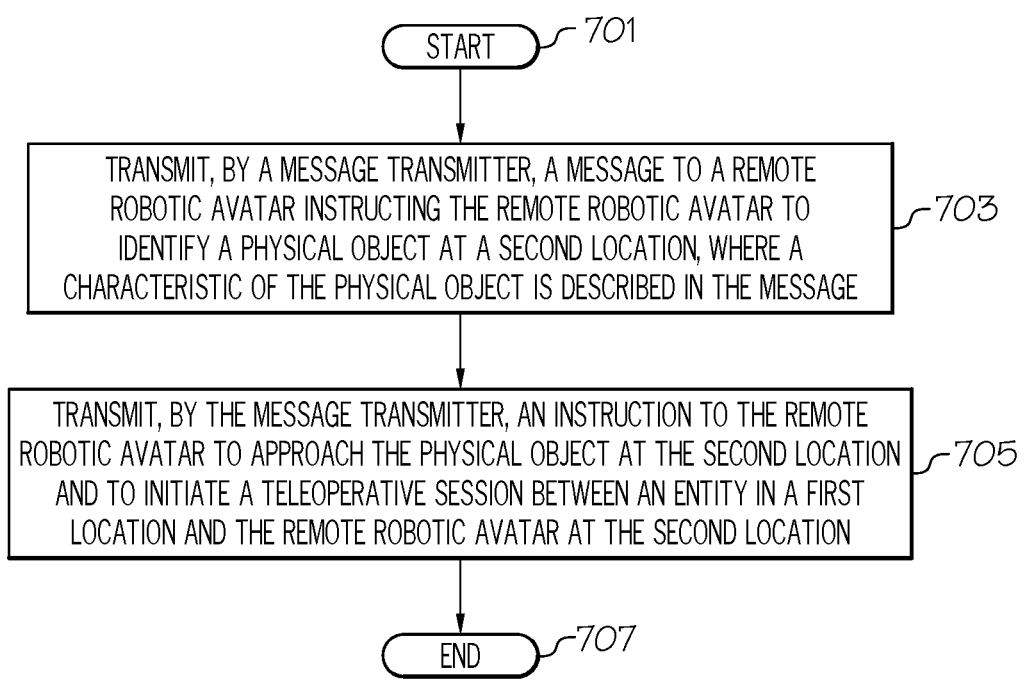
FIG. 7 is a high-level flow chart of one or more steps performed by one or more processors and/or other hardware devices in accordance with one or more embodiments of the present invention.

With reference now to FIG. 7, a high-level flow chart of one or more steps performed by one or more processors and/or other hardware devices in accordance with one or more embodiments of the present invention is presented. After initiator block 701, a message transmitter (e.g., avatar coordinating system 301 shown in FIG. 3) transmits a message to a remote robotic avatar (e.g., remote robotic avatar 351) instructing the remote robotic avatar to identify a physical object (e.g., Object A'—object 309b) at a second location (e.g., second location 311), as described in block 703. The message includes a description of a characteristic of the physical object. For example, the message may include a machine-readable description of the physical object, and/or a pre-defined code representing the type of the physical object, and/or a digital photograph that describes a visual characteristic of the physical object, and/or a digital chemical signature that describes a smell of the physical object (e.g., an exhaust smell from an engine), and/or a digital audio signature that describes a typical sound being emanated by the physical object (e.g., a whirring sound from a pump, a cry from a child, etc.), and/or other characteristic descriptors.

As described in block 705, the message transmitter also transmits an instruction to the remote robotic avatar to approach the physical object at the second location and to initiate a teleoperative session between an entity in a first location and the remote robotic avatar at the second location. That is, once the remote robotic avatar has visually or aurally or chemically or otherwise identified the physical object, it moves towards the physical object and begins a teleoperative session with an entity in a first location.

In an embodiment of the present invention, the teleoperative session is an audio-visual telecommunication session, such as depicted in FIG. 4 between the daughter and mother.

In an embodiment of the present invention, the teleoperative session directs the remote robotic avatar to perform a physical operation on the physical object. For example, once the remote robotic avatar reaches the physical object, it may be directed to interact with the physical object. For example, the remote robotic avatar may be directed to utilize the manipulator 208 shown in FIG. 2, when configured as a set of mechanical arms, to pick up the physical object, which may be animate (e.g., an injured person) or inanimate (e.g., a box). In another scenario, in which manipulator 208 is a device that is able to interact with a device in a non-touching way, it may spray water on the physical object in order to put out a fire that is consuming the physical object, or may spray a chemical agent onto the physical object in order to render it inoperative (e.g., disabling a dangerous item).

The flow-chart in FIG. 7 ends at terminator block 707.

In an embodiment of the invention described in FIG. 7, the physical object is a particular type of object. As such, one or more processors will define a functional area in the second location based the particular type of object, as discussed in FIG. 5-FIG. 6. A sensor at the second location detects that the physical object has been removed from the second location. As such, the remote robotic avatar can no longer approach that physical object, since it is no longer in the second location. Nonetheless, the remote robotic avatar can still be directed to approach the functional area in second location which the second object has been removed. Thus, in this embodiment, the functional area is permanently defined according to the object that was initially located in the functional area, regardless of whether or not the object is later removed. For example, a "sitting area", as initially defined by the presence of a chair in the area, will always be the "sitting area", even if the chair is later removed from the area.

In an alternative embodiment, however, functional areas are mobile. That is, assume that a chair is initially in a first area. The system will define that first location as the functional area "sitting area". However, if the chair is later moved to a second area, then that second area becomes the functional area "sitting area". The first area may or may not also retain its initial designation as a "sitting area".

In one or more embodiments of the present invention, the entity in the first location is either a person operating a functionality remote controller for the remote robotic avatar, or is an autonomous functionality remote controller for the remote robotic avatar. For example, assume that the remote robotic avatar in a second location is in communication with a smart phone being operated by a person in a first location (see FIG. 3). While the smart phone does not directly control the movement of the remote robotic avatar (e.g., with directions such as "move left" or "move forward for 10 feet", etc.), the smart phone can direct the remote robotic avatar to perform a function such as picking up an object, putting out a fire, etc. If programmed properly, the smart phone can perform these actions automatically as an autonomous functionality remote controller (e.g., in response to detecting that the physical object is on fire).

Figure 8:
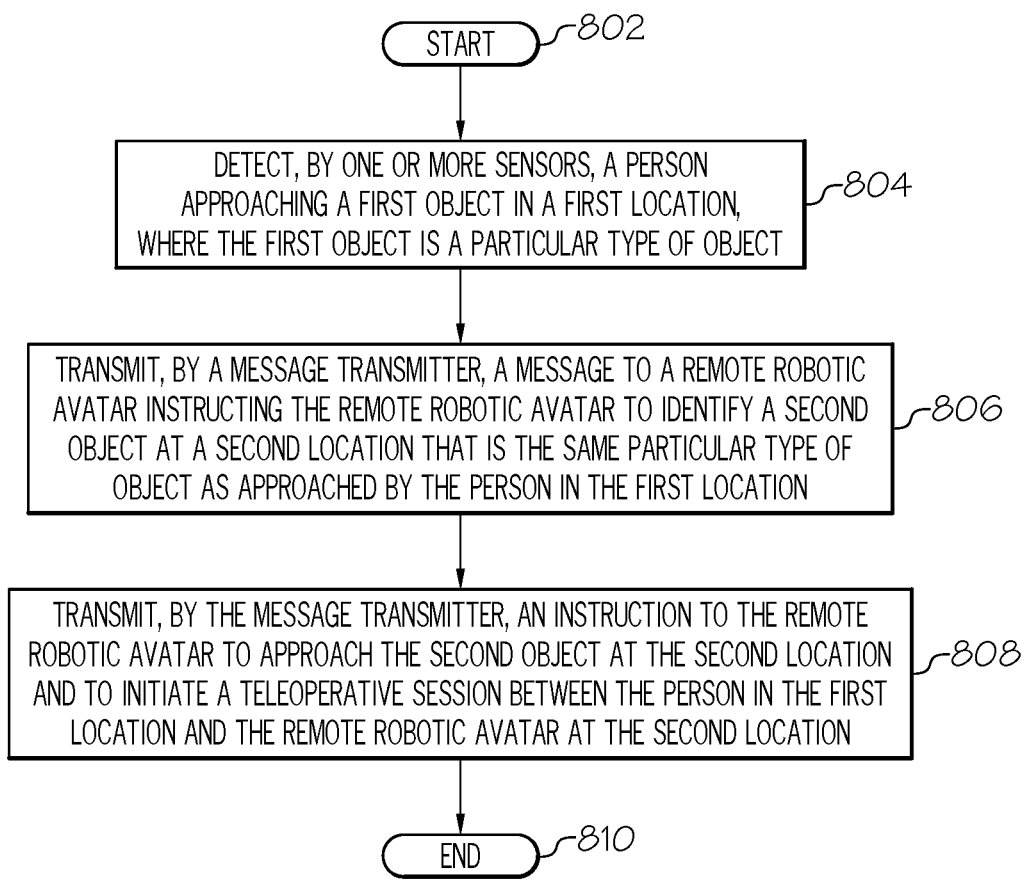
FIG. 8 is a high-level flow chart of one or more steps performed by one or more processors and/or other hardware devices in accordance with one or more alternative embodiments of the present invention.

With regard to FIG. 8, a high-level flow chart of one or more steps performed by one or more processors and/or other hardware devices in accordance with one or more alternative embodiments of the present invention is presented.

After initiator block 802, one or more sensors (e.g., personal monitor 307 shown in FIG. 3) detect a first person (e.g., person 303) approaching a first object (e.g., Object A) in a first location (e.g., first location 305), as described in block 804. This first object is a particular type of object, such as a red box, a small person, a hot oven, etc.

As described in block 806, a message transmitter (e.g., avatar coordinating system 301 shown in FIG. 3) transmits a message to a remote robotic avatar instructing the remote robotic avatar (e.g., remote robotic avatar 351 shown in FIG. 3) to identify a second object (e.g., Object A') at a second location (e.g., second location 311). The remote robotic avatar is at the second location that is remote from the first location, as shown in FIG. 3. Furthermore, the second object is the particular type of object as that of the first object. That is, if Object A is a white box, then Object A' is also a box, preferably white, and preferably having the same physical dimensions as Object A. The level of matching between Object A and Object A' can be set by the user (e.g., within certain ranges of in size, color, smell, etc.), or they may be pre-calibrated by the avatar coordinating system 301 based on heuristic learning (e.g., past experiences in which the remote robotic avatar 351 has or has not approached the proper Object A').

As described in block 808, the message transmitter transmits an instruction to the remote robotic avatar to approach the (identified) second object at the second location and to initiate a teleoperative session between the first person in the first location and the remote robotic avatar at the second location. That is, the teleoperative session may be a telecommunication session between the first person in the local location and a second person at the second location, as described in FIG. 4, or the teleoperative session may direct the remote robotic avatar to perform a physical operation on the second object (as discussed above).

The flow-chart ends at terminator block 810.

In an embodiment of the present invention (and as described above), the method may further include one or more processors (e.g., within personal monitor 307 and/or avatar coordinating system 301) defining a first functional area in the local location and a second functional area in the second location based on the particular type of object, where the first functional area and the second functional area are a same type of functional area; a sensor at the second location detecting that the second object has been removed from the second location; the sensor(s) detecting that the first person has re-approached the first object in the first location; and the message transmitter transmitting a message to the remote robotic avatar to approach the second functional area in the second location from which the second object has been removed (see FIG. 5-FIG. 6). That is, even though a defining object (e.g., a sofa) has been removed from a functional area (a sitting area), the functional area remains defined as a location to which the remote robotic avatar should travel.

As described above, the first object to which the person in the first location is walking may be either a physical object or a pictorial representation of the particular type of object. Either way, the avatar coordinating system, upon receiving an image from the personal monitor (e.g., a camera) of the first object, will be able to instruct the remote robotic avatar what type of Object A' to look for and to approach.

In an embodiment of the present invention, a robotic avatar includes: a sensor receiver (e.g., transceiver 202 shown in FIG. 2) for receiving sensor readings from a set of one or more sensors (e.g., personal monitor 307 shown in FIG. 3) at a first location (e.g., first location 305). The set of one or more sensors detects a first person (e.g., person 303) approaching a first object (e.g., Object A) in the first location. As described herein, the first object is a particular type of object (e.g., a red box, a hot stove, a sofa, etc.).

The robotic avatar also includes an instruction receiver (e.g., also transceiver 202 shown in FIG. 2) for receiving a message instructing the robotic avatar to identify a second object (e.g., Object A' shown in FIG. 3) in a second location (e.g., second location 311). The second object is the same type of object as the first object, and the robotic avatar is in the second location that is remote from the first location.

The robotic avatar also includes an autonomous locomotion system (e.g. locomotion mechanism 210 shown in FIG. 2) for approaching the second object in response to receiving the message instructing the robotic avatar to approach the second object at the second location.

The robotic avatar also includes a teleoperative device (e.g., video display 209, audio speaker 204, manipulator 208 shown in FIG. 2) for performing a teleoperative session between the first person in the first location and the robotic avatar in the second location in response to the robotic avatar approaching the second object in the second location.

The robotic avatar is also capable of utilizing on-board processors to: define a first functional area in the first location and a second functional area in the second location based the particular type of object, where the first functional area and the second functional area are a same type of functional area; detect, based on a signal from a sensor at the second location, that the second object has been removed from the second location; receive a message indicating that the first person has re-approached the first object; and direct the robotic avatar to approach the second functional area in the second location from which the second object has been removed. That is, even if the defining object has been removed, the robotic avatar still knows which functional area to travel to.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
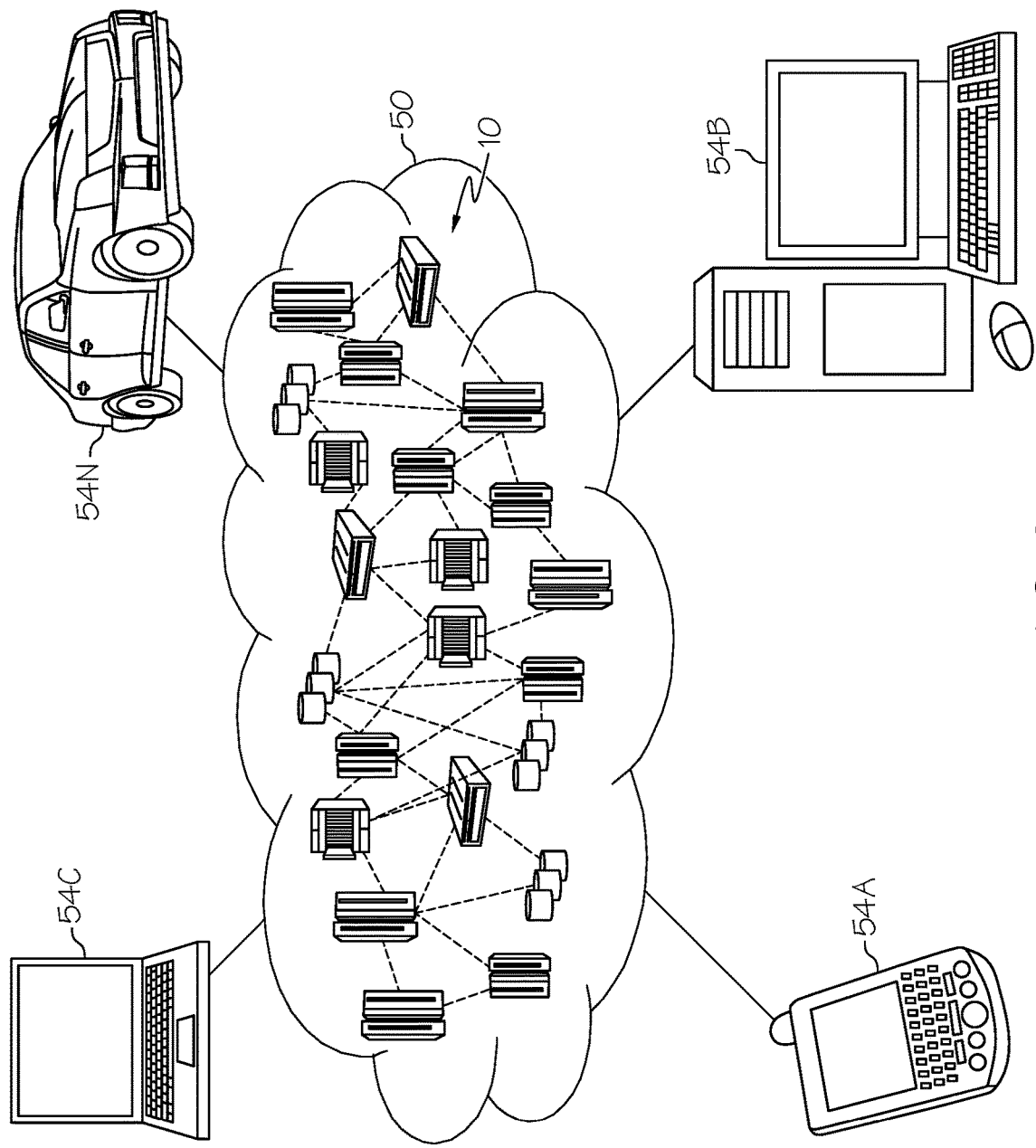
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
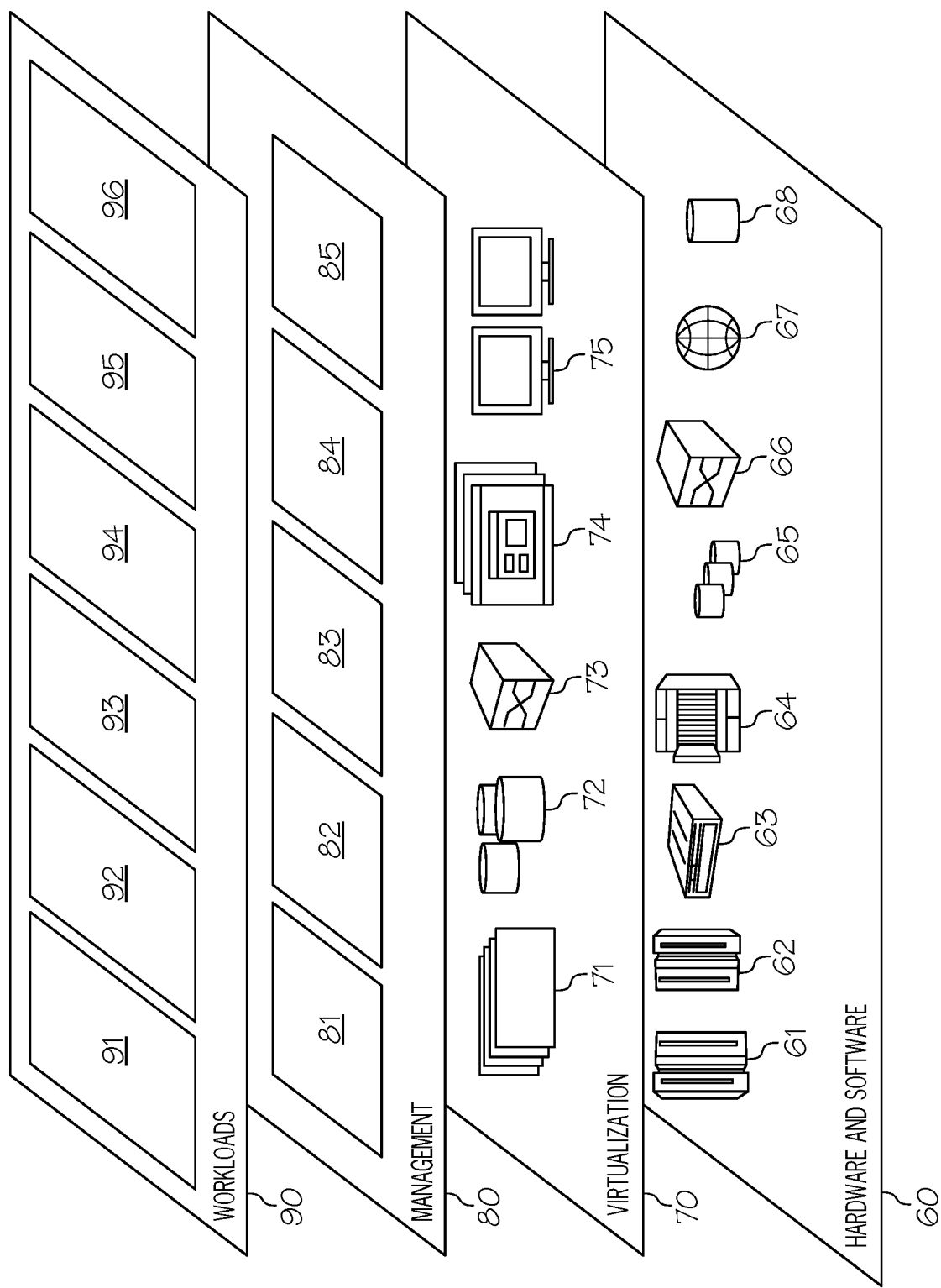
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and robotic avatar control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    detecting, by a first set of one or more sensors, a first person approaching a first object in a first location, wherein the first set of one or more sensors are within a first proximity of the first object required by the first set of one or more sensors to detect and distinguish physical features of the first object at the first location;
    transmitting, by a message transmitter, a message to a remote robotic avatar instructing the remote robotic avatar to utilize sensor readings from a second set of one or more sensors at a second location to identify a second object at the second location, wherein the remote robotic avatar is located at the second location, wherein the second location is remote from the first location, and wherein the second set of one or more sensors are within a second proximity of the second object required by the second set of one or more sensors to detect and distinguish physical features of the second object at the second location;
    comparing, by an avatar coordinating system, the first object to the second object;
    determining, by the avatar coordinating system, that the first object and the second object share a predefined set of one or more physical features; and
    in response to determining that the first object and the second object share the predefined set of one or more physical features, transmitting, by the message transmitter, an instruction to the remote robotic avatar to approach the second object at the second location and to initiate a teleoperative session between the first person in the first location and the remote robotic avatar at the second location.

2. The method of claim 1, further comprising:
defining, by one or more processors, a first functional area in the first location and a second functional area in the second location based on the shared predefined set of one or more physical features, wherein the first functional area and the second functional area are a same type of functional area;
detecting, by a sensor at the second location, that the second object has been removed from the second location;
detecting, by the one or more sensors, that the first person has re-approached the first object; and
transmitting, by the message transmitter, a message to the remote robotic avatar to approach the second functional area in the second location from which the second object has been removed.

3. The method of claim 1, wherein the first set of one or more sensors and the second set of one or more sensors are from a group of sensors consisting of a video camera, a sound detector, a chemical detector, and a vibration detector.

4. The method of claim 1, wherein the teleoperative session is a telecommunication session between the first person in the first location and a second person at the second location.

5. The method of claim 1, wherein the teleoperative session directs the remote robotic avatar to perform a physical operation on the second object.

6. The method of claim 1, wherein the first object is a physical object.

7. The method of claim 1, wherein the first object is a pictorial representation of a physical object having the predefined set of one or more physical features.

8. A method comprising:
transmitting, by a message transmitter, a message to a remote robotic avatar instructing the remote robotic avatar to identify a physical object at a second location, wherein the remote robotic avatar is located at the second location, wherein the physical object is a non-living mechanical device, and wherein a characteristic of the physical object is described in the message; and
transmitting, by the message transmitter, an instruction to the remote robotic avatar to approach the physical object at the second location and to initiate a teleoperative session between an entity in a first location and the remote robotic avatar at the second location, wherein the teleoperative session comprises the entity in the first location teleoperatively directing one or more mechanical appendages on the remote robotic avatar to perform a predefined physical operation on the physical object at the second location.

9. The method of claim 8, further comprising:
defining a functional area in the second location for the physical object;
detecting, by a sensor at the second location, that the physical object has been removed from the second location; and
transmitting, by the message transmitter, a message to the remote robotic avatar to approach the functional area in the second location in which the second object has been removed.

10. The method of claim 8, wherein the physical object is identified by one or more sensors, and wherein the one or more sensors are from a group of sensors consisting of a video camera, a sound detector, a chemical detector, a vibration detector.

11. The method of claim 8, wherein the teleoperative session further comprises a telecommunication session between a first person in the first location and a second person at the second location.

12. The method of claim 8, wherein the entity in the first location is a person operating a functionality remote controller for the remote robotic avatar.

13. The method of claim 8, wherein the entity in the first location is an autonomous functionality remote controller for the remote robotic avatar.

14. A robotic avatar comprising:
a sensor reading receiver for receiving sensor readings from a first set of one or more sensors at a first location, wherein the set of one or more sensors detects a first person approaching a first object in the first location, wherein the first set of one or more sensors are within a first proximity of the first object required by the first set of one or more sensors to detect and distinguish physical features of the first object at the first location;
an instruction receiver for receiving a message instructing the robotic avatar to identify a second object in a second location, wherein the robotic avatar is located at the second location, wherein the second location is remote from the first location, wherein second object in the second location is detected and distinguished by a second set of one or more sensors at the second location, and wherein the second set of one or more sensors are within a second proximity of the second object required by the second set of one or more sensors to detect and distinguish physical features of the second object at the second location;
an avatar coordinating system for comparing the first object to the second object in order to determine that the first object and the second object share a predefined set of physical features;
an autonomous locomotion system for approaching the second object in response to receiving the message instructing the robotic avatar to approach the second object at the second location and in response to determining that the first object and the second object share the predefined set of physical features; and
a teleoperative device for performing a teleoperative session between the first person in the first location and the robotic avatar in the second location in response to the robotic avatar approaching the second object in the second location.

15. The robotic avatar of claim 14, wherein the robotic avatar further comprises one or more processors configured to perform a method comprising:
defining a first functional area in the first location and a second functional area in the second location based on the shared predefined set of one or more physical features, wherein the first functional area and the second functional area are a same type of functional area;
detecting, based on a signal from a sensor at the second location, that the second object has been removed from the second location;
receiving a message indicating that the first person has re-approached the first object; and
directing the robotic avatar to approach the second functional area in the second location from which the second object has been removed.

16. The robotic avatar of claim 14, wherein the first set of one or more sensors and the second set of one or more sensors are from a group of sensors consisting of a video camera, a sound detector, a chemical detector, and a vibration detector.

17. The robotic avatar of claim 14, wherein the teleoperative session is a telecommunication session is between the first person in the first location and a second person at the second location.

18. The robotic avatar in claim 14, wherein the teleoperative session directs the remote robotic avatar to perform a physical operation on the second object.

* * * * *